United States Patent [19]

Chaffee

[11] 4,434,493
[45] Feb. 28, 1984

[54] ARGON-ION GAS LASER CATHODE CONSTRUCTION

[75] Inventor: Edwin G. Chaffee, Salt Lake City, Utah

[73] Assignee: American Laser Corporation, Salt Lake City, Utah

[21] Appl. No.: 327,068

[22] Filed: Dec. 3, 1981

[51] Int. Cl.³ .............................................. H01S 3/09
[52] U.S. Cl. ........................................ 372/86; 372/87
[58] Field of Search ................... 372/87, 88, 86, 81, 372/62, 76; 313/346 R, 346 DC

[56] References Cited

U.S. PATENT DOCUMENTS 3,670,262 6/1972 Hallock et al. ...................... 372/62
4,378,600 3/1983 Hobart ................................ 372/62

*Primary Examiner*—James W. Davie
*Attorney, Agent, or Firm*—B. B. Olive

[57] ABSTRACT

An improved argon-ion gas laser utilizes a dispenser-type cathode and within the cathode shroud mounts a preignition electrode and a heat shield enabling the cathode to be operated efficiently and within a 900°–1050° C. temperature range over an extended period of time.

7 Claims, 3 Drawing Figures

ARGON-ION GAS LASER CATHODE CONSTRUCTION

DESCRIPTION

1. Technical Field

The invention relates to cathode constructions for argon-ion gas lasers.

2. Background Art

It is known in the prior high vacuum tube art that the lifetime of a dispenser-type, i.e., tungsten matrix, cathode is dependent on its operating temperature. The higher the high vacuum type cathode operating temperature, the higher is the rate of evaporation of the emission mix. Manufacturers of high vacuum tube dispenser cathodes have provided well documented data on life versus operating cathode temperature. For a long lifetime, i.e., greater than 10,000 hours, the operating cathode temperature of high vacuum tubes should be kept in the range of 1000° C.–1100° C.

Early argon-ion gas lasers employed dispenser cathodes operating at about 1150° C. This practice followed the practice in high vacuum tube devices which are commonly built with cathodes operating at or near this temperature as a trade-off between performance and lifetime. In high vacuum tube devices, electron beam focusing becomes difficult with high space charge. The emitting surface area of the high vacuum tube cathode is thus limited and the operating temperature is commonly higher than 1100° C. to obtain operation in such a device.

The ability to operate an argon-ion gas laser having a dispenser-type cathode over a long period of time within a range of 900° C.–1050° C. has not heretofore been achieved so far as is known. Of particular significance to the invention is that prior art argon-ion gas lasers having a dispenser-type cathode have had no means for providing a localized gas discharge prior to initiating the main bore discharge. Further, there has been no proven means for establising a localized discharge proximate a dispenser-type cathode and operative in an argon-ion gas laser prior to establishing the main discharge as a means for extending the life of the cathode and thus extending the overall life of the laser.

As another aspect of vacuum tube prior art, it is recognized that a heat shield has been employed to improve heater efficiency. However, a multi-layer heat shield surrounding a dispenser-type cathode in conjunction with means enabling the cathode to operate at a substantially lower temperature than has been the normal practice has not been used.

With the foregoing in mind, the present invention has as an object providing an improved argon-ion gas laser having a dispenser-type cathode construction enabling the cathode to operate at substantially less temperature than normal with improved heater efficiency and with a substantial reduction in power input to the cathode.

DISCLOSURE OF INVENTION

The invention recognizes that in an argon-ion gas laser having a dispenser-type cathode, i.e., with a tungsten matrix and characteristically operating with a neutralized ion plasma, the operating temperature of the cathode does not affect performance of the laser as long as there is sufficient emission present to start and maintain the discharge. Therefore, the cathode temperature in this type laser may be substantially reduced for a given cathode size and benefits of long life obtained providing proper starting conditions are maintained. A preignition electrode located near the cathode is employed for establishing a low power discharge near the cathode prior to and during ignition of the laser discharge. The presence and operation of the preignition electrode has been discovered as an essential means enabling the cathode to operate at reduced temperature and for substantially longer life than normal. Improved performance is also obtained by utilizing a plurality of heat shields in conjunction with the dispenser-type cathode to improve heater efficiency and reduce the required cathode heater power. Thus, overall, the invention provides an improved argon-ion gas laser having a dispenser-type cathode designed to operate at relatively low temperature and achieve a relatively long cathode life. In addition, the improved laser of the invention achieves a substantial reduction in the evaporation rate of the cathode mix to reduce window contamination as a further means for extending the lifetime of the laser tube.

BEST MODE FOR CARRYING OUT THE INVENTION

Figure 1:
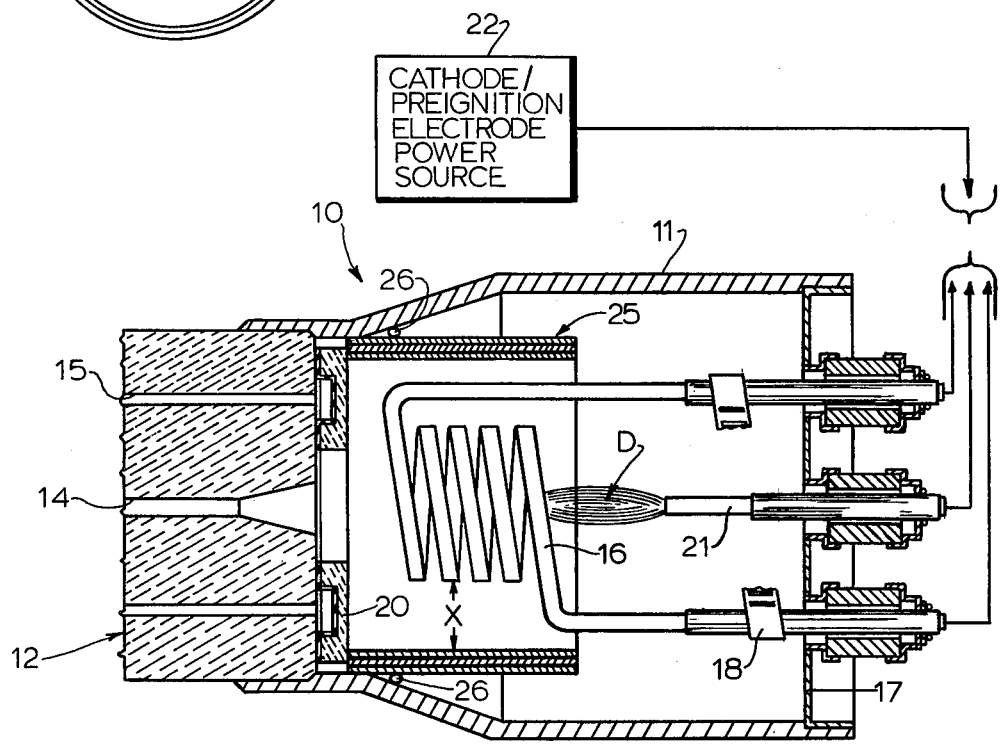
FIG. 1 is a partial cross-sectional view of the cathode end of an argon-ion gas laser incorporating a dispenser type cathode, a preignition electrode and a multi-layer heat shield according to the invention.

With reference to the drawings, the improved cathode construction 10 according to the invention is illustrated in FIG. 1 in association with selected elements forming the cathode end of an argon-ion gas laser. A conventional metal end shroud 11 is secured to the ceramic laser tube 12 incorporating a main discharge bore 14 and surrounding bypass gas bores 15 running lengthwise of tube 12. In the embodiment being used by way of example, shroud 11 is formed of an iron-nickle-cobalt alloy sold under the trademark "Kovar" and shroud 11 is brazed to the metallized cathode end of laser tube 12 formed of beryllium oxide ceramic and conventionally of cylindrical shape.

The dispenser-type cathode 16 is mounted concentrically within shroud 11 with its leads passing through mounting cap 17. Cathode 16 in the illustrated embodiment is made of a coil of tungsten sintered to 80% density and impregnated with a barium-calcium-aluminate mix. Shroud 11, tube 12 and cathode 16 follow a construction previously employed in the Model 60B argon-ion gas laser made by American Laser Corporation of Salt Lake City, Utah, and are therefore understood in the art and somewhat schematically illustrated. A partially illustrated and conventional getter strip 18 mounts within shroud 11. The conventional gas-filled and window-mounting tube which normally mounts within and extends outwardly from the central aperture 19 of cap 17 seen in FIG. 3 has been eliminated in order to simplify the drawings. A ceramic baffle disk 20 is mounted between cathode 16 and the end of tube 12 and provides a means for inhibiting ignition of the bypass gas in the tube bypass gas bores 15 as more fully described in copending patent application Ser. No. 232,539, entitled "Laser Bypass Inhibitor", filed Feb. 9, 1981 now U.S. Pat. No. 4,385,390.

Figure 2:
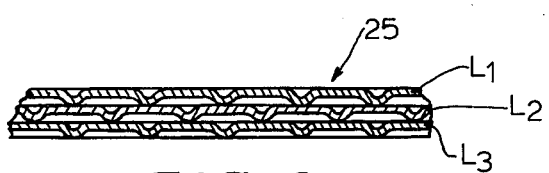
FIG. 2 is an enlarged cross-sectional view of the multi-layer heat shield shown in FIG. 1 with the layers being greatly enlarged.

A multi-layer heat shield 25 is formed from a dimpled, thin, e.g., 0.002 inch, molybdenum sheet coiled into a cylindrical form so as to provide a multi-layer shield surrounding cathode 16. Shield 25 is brazed to shroud 11 by an annular brazing bead at location 26 as indicated in FIG. 1. As further illustrated in FIG. 2, the dimples 27 formed in the sheet material comprising shield 25 serve as a means for providing thermal insulation between the individual $L_1$, $L_2$, $L_3$ layers of shield 25. While illustrated as three concentric layers, the invention recognizes that more than three layers could be employed within the scope of the invention. In connection with mounting the shield 25, it is to be noted that the distance X between the shield 25 and the cathode 16 should be at a minimum to gain maximum effectiveness from shield 25.

Figure 3:
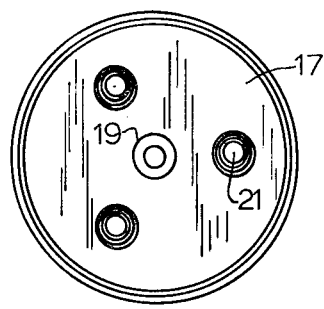
FIG. 3 is an end view of FIG. 1.

As previously mentioned, an important aspect of the invention relates to recognizing that the life of a dispenser-type cathode in an argon-ion gas laser can be substantially lengthened by reducing the temperature of the cathode, since a beam space charge as experienced in a high vacuum tube does not exist in the neutralized plasma of an argon-ion gas laser. Thus, the invention recognizes that provided sufficient emission is available at the cathode to start and maintain the discharge, the normal operating temperature of a dispenser-type cathode operating in an argon-ion gas laser can be substantially reduced to achieve the benefits of long life of the cathode. As a significant aspect of the invention, the improved cathode construction 10 incorporates a preignition electrode 21 as schematically illustrated in FIG. 1. Electrode 21 follows the lead and mounting construction employed for cathode 16. Preignition electrode 21 thus basically comprises a short wire protruding into the cavity formed by shroud 11. Electrode 21, as best seen in FIG. 3, is offset from the central axis passing through cathode 16 and discharge bore 14. Electrode 21 is formed of a suitable material, e.g., tungsten, and is located proximate cathode 16 so as to establish the desired low power localized discharge D as illustrated in FIG. 1 to enhance starting and extend cathode life.

The conventional control and power source 22 used for the previously-mentioned Model 60B laser adapts to use with the present invention with appropriate modification for operation of the preignition electrode 21 in addition to operation of the cathode 16. In practice, cathode 16 is heated under full AC power for approximately 30 seconds to achieve a preignition temperature between 900° C.–1050° C. With cathode 16 remaining energized under full AC power, the power and control source 22 operates to provide a DC power source for the preignition electrode 21 and with appropriate current-limiting means to produce under substantially low power a localized discharge D (FIG. 1) near cathode 16 and which is preferably maintained for about two to five seconds. While leaving the DC, current-limited power connected to the preignition electrode 21, in the final and next operation the DC main discharge is established under the desired full starting power.

The aforementioned improved cathode construction and method of starting up the improved argon-ion gas laser of the invention provides several advantages. There has been a noticeable and substantial increase in the operating life of the cathode 16. Further, there has been achieved a substantial reduction in the evaporation rate of the cathode mix which has led to a reduction in window contamination so as to further extend the lifetime of the laser tube. Further, the use of such a preignition localized breakdown technique has been found useful in establishing a start-up condition conducive to operating the dispenser-type cathode with the characteristic neutralized ion plasma under full power in a relatively low operating temperature range, i.e., 900° C.–1050° C. for a substantially long period of time. The improved heater efficiency and consequent reduction in required cathode power brought about by use of the heat shield 25 has also contributed to an overall improved cathode construction for a dispenser-type argon-ion gas laser. Additionally, the bypass gas ignition inhibiting characteristics of disk 20 mounted on tube 12 are retained while enjoying the advantages of the present invention. Operating life of several thousand or more operating hours has thus been achieved on a practical basis in an argon-ion gas laser and with a dispenser-type cathode operating satisfactorily in the relatively low 900° C.–1050° C. range.

I claim:

1. In an argon-ion gas laser, in combination:
   (a) a cylindrical-shaped laser tube having a central main discharge bore extending lengthwise from a cathode end thereof;
   (b) a metal formed end shroud metallically bonded to said cathode end of said tube for reception of a dispenser-type cathode therein;
   (c) a dispenser-type coiled cathode supported concentric with the axis of said tube within said shroud proximate said cathode end and formed of an emission mix having a operating life dependent on operating temperature and suited to normally operating within a 900°–1050° C. range with minimal rate of evaporation;
   (d) electrode means offset from the axis of said tube and located proximate said cathode and including means operative when said electrode means is energized for establishing preignition in the nature of a localized gas breakdown proximate the cathode sufficient to initiate the tube discharge prior to applying full starting power to the laser; and
   (e) means for energizing said cathode and preignition electrode means prior to applying full starting power for establishing the main discharge through said tube and for thereafter operating the laser under full power and said cathode within a temperature range of 900°–1050° C.

2. In an argon-ion gas laser as claimed in claim 1 including:
   shielding means comprising a thin, metallic, sheet material coiled in a multi-layer coil mounted within, metallically bonded to and concentrically arranged within said shroud, said shielding means surrounding said cathode in spaced relation thereto.

3. In an argon-ion gas laser as claimed in claim 2 wherein said sheet material is preformed in a manner enabling thermal insulating space to be established between the coiled layers thereof.

4. In an argon-ion gas laser as claimed in claim 2 wherein said sheet material comprises molybdenum.

5. In an argon-ion gas laser as claimed in claim 2 wherein said sheet material comprises molybdenum, is approximately 0.002 inches thick and is preformed in a manner enabling the coiled layers thereof to maintain a thermally insulating space therebetween.

6. In an argon-ion gas laser having a laser tube with a dispenser type coiled cathode operatively associated therewith and located concentric with the axis of the laser tube, in combination:
   (a) electrode means positioned in offset relation to the tube axis and proximate the cathode for establishing a localized gas breakdown proximate the cathode sufficient to initiate the tube discharge prior to starting and operating the laser under full power; and
   (b) means operatively associated with said electrode means and cathode for energizing said cathode and electrode means and for thereafter operating said cathode within a temperature range of 900°–1050° C. over an extended period of time and said laser under full power.

7. The method of starting and operating an argon-ion gas laser of the type having a laser tube with a dispenser type coiled cathode surrounded by a metal shroud bonded to the laser tube with the cathode being mounted concentric with the axis of the tube, comprising:
   (a) heating the cathode to achieve a preignition temperature of between 900° and 1050° C.;
   (b) establishing a localized discharge near the cathode; and
   (c) establishing the main discharge in the laser tube under the desired full starting power.

* * * * *